United States Patent [19]

Schwarz et al.

[11] Patent Number: 5,097,454

[45] Date of Patent: * Mar. 17, 1992

[54] SECURITY DOOR WITH IMPROVED SENSOR FOR DETECTING UNAUTHORIZED PASSAGE

[75] Inventors: Milan Schwarz, 4985 Old Ranch Rd., La Verne, Calif. 91711; Robert Mayer, Pleasanton, Calif.

[73] Assignee: Milan Schwarz, La Verne, Calif.

[*] Notice: The portion of the term of this patent subsequent to Apr. 30, 2008 has been disclaimed.

[21] Appl. No.: 607,236

[22] Filed: Oct. 31, 1990

Related U.S. Application Data

[63] Continuation of Ser. No. 419,760, Oct. 11, 1989, Pat. No. 5,012,455.

[51] Int. Cl.⁵ .............................................. G08B 13/16
[52] U.S. Cl. .......................................... 367/93; 49/31; 109/8; 340/541
[58] Field of Search ................. 367/93; 340/552, 541, 340/545; 49/26, 31; 109/8

[56] References Cited

U.S. PATENT DOCUMENTS

| | | | |
|---|---|---|---|
| 4,060,039 | 11/1977 | Lagarrigue | 109/3 |
| 4,060,935 | 12/1977 | Miller et al. | 49/25 |
| 4,112,419 | 9/1978 | Kinoshita et al. | 367/94 |
| 4,332,016 | 5/1982 | Berntsen | 367/7 |
| 4,341,165 | 7/1982 | Calandritti et al. | 109/8 |
| 4,347,590 | 8/1982 | Heger et al. | 367/93 |
| 4,475,308 | 10/1984 | Heise et al. | 49/42 |
| 4,485,374 | 11/1984 | Meserow et al. | 340/541 |
| 4,530,183 | 7/1985 | Heise et al. | 49/42 |
| 4,586,195 | 4/1986 | DeGeorge et al. | 381/92 |
| 4,627,193 | 12/1986 | Schwarz | 49/42 |
| 4,628,496 | 12/1986 | Lee | 367/93 |
| 4,682,153 | 7/1987 | Boozer et al. | 340/507 |

*Primary Examiner*—Glen R. Swann, III
*Attorney, Agent, or Firm*—Christie, Parker & Hale

[57] ABSTRACT

A control system for a revolving door includes an ultrasonic sensor having multiple sensor heads. The door has a housing, and multiple moveable compartments formed by door wings attached to and radially extending from a rotatable axis. The sensors emit energy waves into the housing in bursts, then receive echoes from any objects, including people, in the chambers. The sensors are activated when the door is activated by an authorized user. A controller stores a binary "echo" or "no echo" signal in memory in response to an emitted energy wave. The memory is formed by multiple arrays, each array having a column associated with a particular sensor and used for storing echo signals from a particular ultrasonic burst. Each bit in a column represents incremental ranges of objects from the sensor head, and the controller stores the "echo" or "no echo" signal in an appropriate bit based on the elapsed time from the preceding burst. To avoid interference from reverberations, the burst cycle time is varied, the amount of time following each burst is sufficiently greater than the time for receiving an echo from the floor of the housing so that reverberations will die down, and multiple arrays of echo data are filled with corresponding results and ANDed together to form a results array. The controller uses the results array to determine whether there is an object in an unauthorized chamber. The system also ignores signals which are given from the top of a door wing passing by a sensor head.

20 Claims, 5 Drawing Sheets

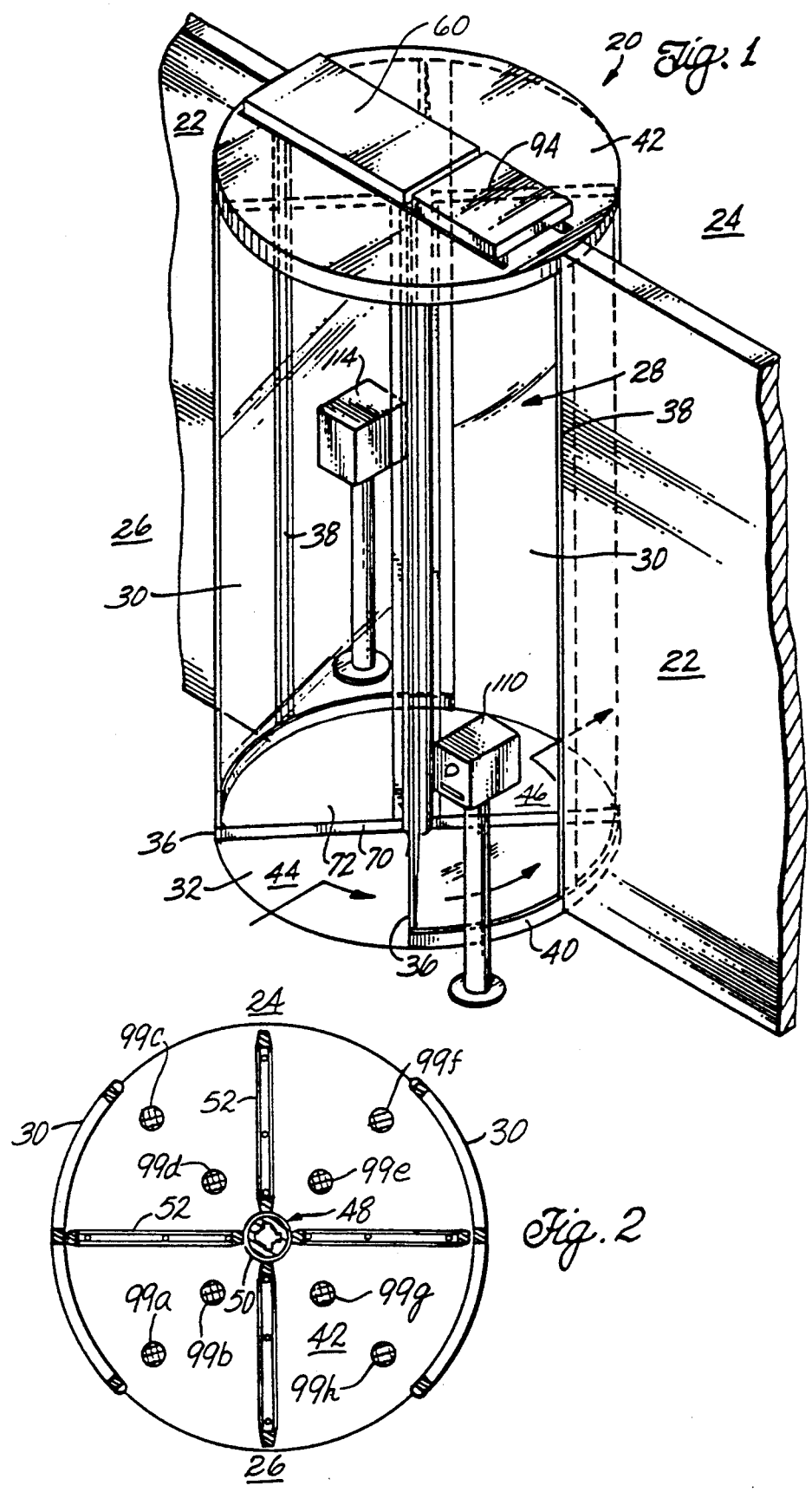

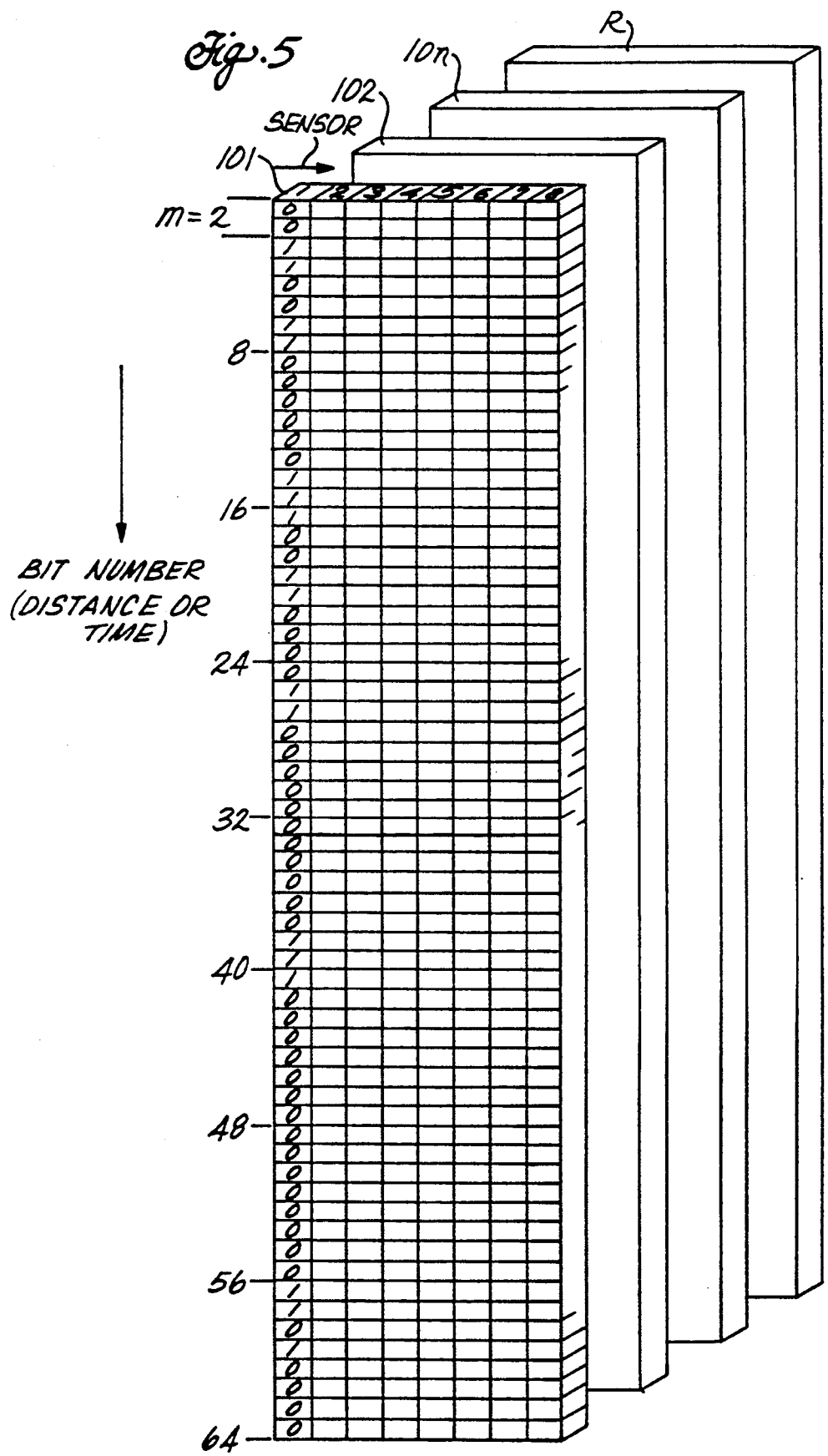

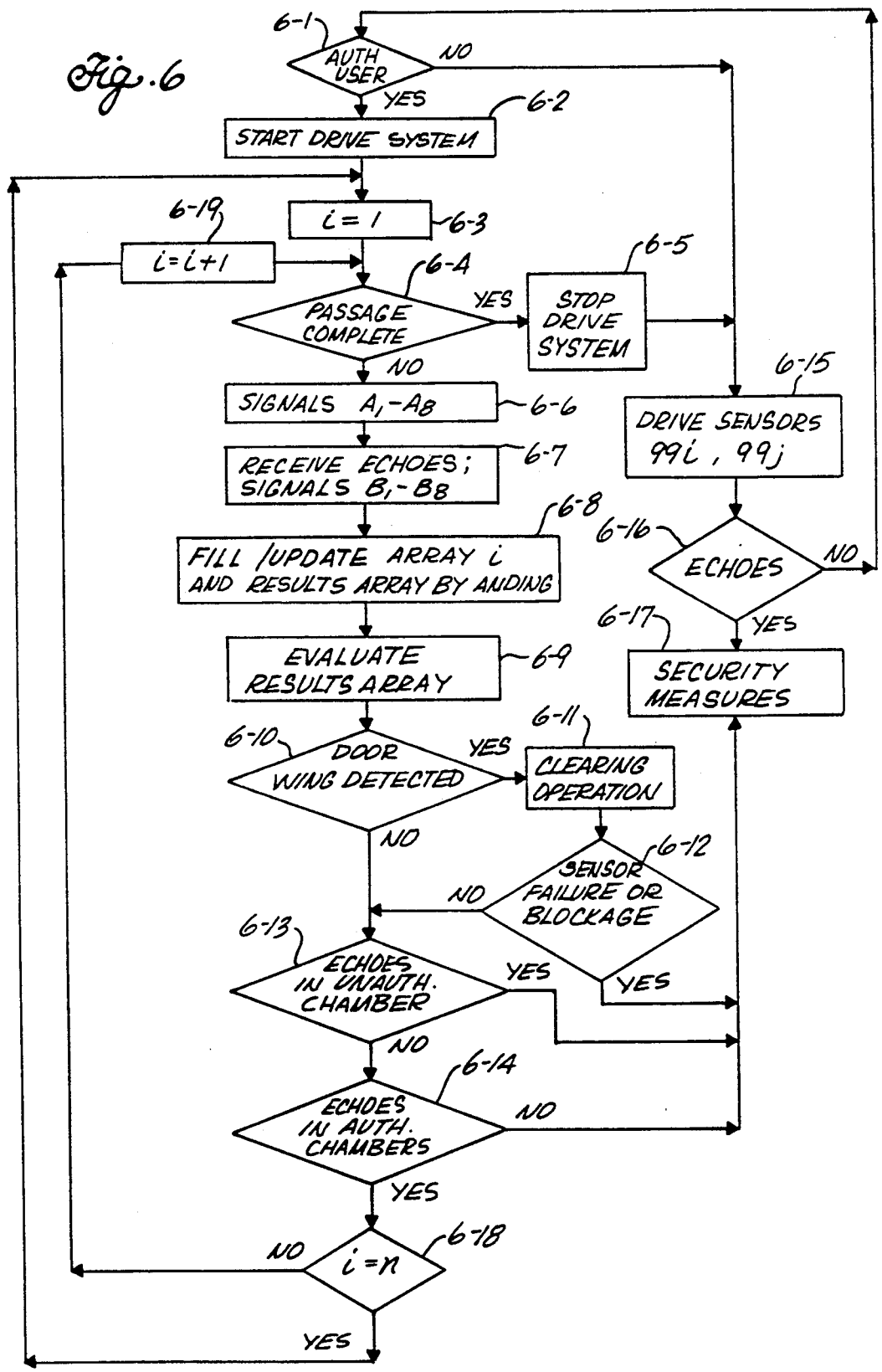

SECURITY DOOR WITH IMPROVED SENSOR FOR DETECTING UNAUTHORIZED PASSAGE

This is a continuation of application Ser. No. 07/419,760 filed Oct. 11, 1989, now U.S. Pat. No. 5,012,455, issued Apr. 30, 1991.

BACKGROUND OF THE INVENTION

This invention relates generally to security passageways, and particularly to security doors and the sensing of unauthorized passage of objects as well as people through the doors.

Security doors are used in airports, banks, commercial buildings, military installations, and other locations where restricted access is desirable. One type of passenger compartments defined by panels. For example, such a revolving door is disclosed in U.S. Pat. No. 4,627,193 issued on Dec. 6, 1986. Normally, in this type of door a person inserts a pass card into a card identifying device linked with a control mechanism for the door, then enters a compartment on one side of the door. If the card is authorized, the door will turn its panels and thus each compartment until the entered compartment moves from the entrance to the exit. As the entered compartment passes from the entrance to the exit, all of the other compartments move by a corresponding amount. Therefore, it is possible for an unauthorized person to "tailgate", i.e., to either enter the compartment immediately following the authorized party as it passes the entrance, or enter a compartment located at the exit. In the former situation, the unauthorized party will get trapped in the doorway when the door stops. If the door has a "trapped man" feature to detect such a situation, the system will reversely rotate the door after stopping to force the unauthorized "trapped" person back to his starting point. If the door is not equipped with such a "trapped man" feature, the next authorized party to enter the doorway will allow the unauthorized party to pass to the exit. In the situation where the "tailgater" is attempting to pass from the exit to the entrance, the system may also detect him and return him to his starting point before allowing his compartment to reach the entrance.

One way that tailgating has been detected is by the use of floor mats in the security door to detect when a compartment has been entered. However, such mats have several drawbacks. First, rain, snow, dirt or other foreign matter can often cause mat failures. Second, a mat cannot detect a person or object such as a gun or a security pass card attached to the door frame. Third, it is difficult to make a mat sufficiently sensitive to lightweight objects. Accordingly, there is a need to more accurately and reliably detect whether unauthorized parties or objects have entered a compartment of a revolving security door.

It has been proposed to use ultrasonic sensors instead of mats, but use of such sensors in a revolving door presents difficult problems. First, the sensors must distinguish between door panels and people or objects. If the sensors are merely turned off when the door panel passes by, objects attached to or close to the door panel can get through the doorway undetected. Second, to detect small objects such as pass cards or firearms, the sensors must have a high gain. Such a high gain increases the likelihood that reverberations or echoes will cause false readings. This is especially true in a security revolving door which has a substantially closed housing. Similarly, the greater the range (portion of the floor to ceiling distance) covered by the sensor, the greater the likelihood of false readings due primarily to echoes from the floor. Accordingly, floor mats have been popular in security door devices.

SUMMARY OF THE INVENTION

The invention is an improved sensor system for a security door to prevent unauthorized entry to or exit from a secured area. The invention is also a security door including the improved sensor system. The sensor system improves security by greatly enhancing the ability to detect unauthorized persons or objects located in a compartment of the door.

In one embodiment, the security door has a housing having an entrance into and an exit from a room. The door includes a central shaft or the like rotatably disposed in the housing and supporting a plurality of panels or wings which, in cooperation with the housing, define at least one compartment rotatable with the shaft to transport a person between the entrance and exit. The door has a control system which includes a main microprocessor that receives inputs from an identification mechanism such as a card reader and a sensor system and outputs signals to control the door. The control system includes a mechanism for rotating the shaft thereby moving a selected compartment between the entrance and exit in response to identification of an authorized person. As the shaft rotates, the control system keeps track of the position of the authorized chamber.

To establish the progression of the authorized person through the door, the sensor system preferably includes another microprocessor and ultrasonic or other energy sensors for detecting physical objects generates a signal as the authorized person passes through a designated region of the housing. This sensing system will also detect when a person or object is in another compartment. Should the main microprocessor determine that the position of the compartment and the generation of the signal indicate that an unauthorized person or object is in another compartment, the microprocessor will issue a disabling command to prevent further forward movement of all compartments. The disabling command may brake and hold the shaft against rotation, may enable only reverse movement of the compartment to discharge the person within the compartment, or may actually reverse the rotation of the shaft to forcibly discharge all individuals from the door.

In a preferred embodiment, the ultrasonic sensors are located on the ceiling of the door housing for irradiating waves in a generally conical shape downward into the housing. At least two sensors or two sets of sensors are located on the ceiling of the door housing for detecting unauthorized movement of persons or objects from the entrance to the exit as well as from the exit to the entrance. The microprocessor controlling the sensors ignores signals from the door frame yet reacts to signals from objects in those compartments for which passage has not been authorized.

In the preferred embodiment, the sensor controller sends signals to the sensors causing them to emit bursts of ultrasonic waves. The sensors detect echoes of the emitted waves. The controller samples the echoes at predetermined times following a burst and stores a "1" or "0" in an array of memory in response to detection of an echo or no echo. Each array is organized by columns of bits, each column being associated with one sensor, and each bit in the column corresponding to a predetermined elapsed time from a particular ultrasonic burst. Corresponding bits in corresponding columns of each array are ANDed together to reduce the likelihood of a false echo from ghosts caused by any reverberations of echoes. Moreover, burst frequency is preferably varied so that any ghosts will be stored in different bits for different arrays, and will thus be cancelled out by the ANDing process. The amount of time between bursts is preferably sufficient to allow reverberations to die out. In revolving doors where it is possible for echoes or reverberations from one chamber to be detected by sensors in other chambers, bursts from sensor(s) in each compartment are staggered to avoid or minimize such interference.

When unauthorized passage is detected, the control system preferably stops the doorway before the unauthorized person or object can gain passage therethrough, and initiates reverse rotation to move the unauthorized person or object to the place, i.e., the entrance or exit, where it embarked.

The use of such sensors enables the control system to detect not only large objects such as people, but also very small items at substantially any location within a compartment to accurately and reliably detect "tailgating." In a further embodiment, additional ultrasonic sensors are provided to detect trapped objects in the event that the doorway stops with a person or object in a compartment that is not located at an entrance or exit.

The above features and advantages of the invention, as well as additional features and advantages will be appreciated and better understood by reference to the following detailed description when considered in conjunction with the accompanying drawings.

BRIEF DESCRIPTION OF THE DRAWINGS

FIG. 1 is a perspective view of a security door incorporating sensors and a control scheme according to the present invention;

FIG. 2 is a view of the underside of the top of the security door of FIG. 1 to illustrate placement of the sensors;

FIG. 5 is a schematic of the memory used in the control system according to the invention; and FIG. 6 is a flowchart showing the inventive control scheme.

DETAILED DESCRIPTION OF THE PREFERRED EMBODIMENT

Figure 3:
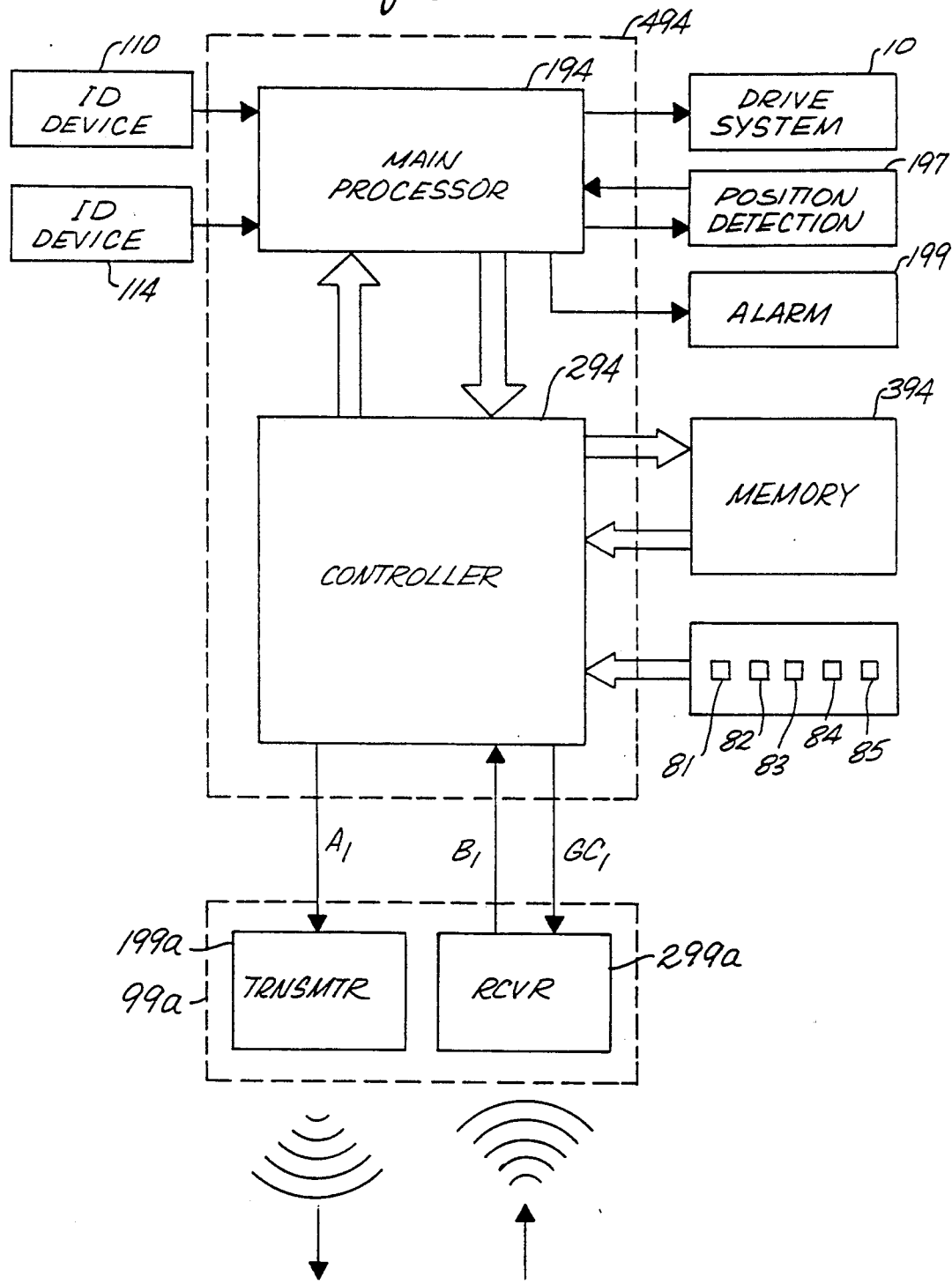
FIG. 3 is a schematic showing major components of the security door control system.

The control and sensor system for a security door according to the invention operate together to detect the presence of unauthorized persons (or objects) attempting to gain passage through the door by "tailgating." When tailgating is detected, the control system will prevent the unauthorized person from passing through by stopping the door. In a preferred embodiment, the door will then be reversed to forcibly move the unauthorized user to the entrance or exit at which he entered the door.

FIG. 1 shows a security door 20 with sensors and a control system according to the present invention. Preferably, the security door 20 is a revolving type. The door is incorporated into a wall 22 which separates a security area 24 from a general access or lesser security area 26. The wall 22 with the door 20 functions as a security barrier between areas 24 and 26.

The door has a cylindrical housing 28 which includes upstanding, semi-cylindrical panels 30. The panels 30, as shown in FIGS. 1 and 2, extend between a circular bottom 32 and a top 42. The panels preferably span approximately 90° of arc. Each panel 30 is fashioned from a pair of semi-cylindrical segments (such as glass) connected between and supported by edge posts 36, a center post 38, and a bottom skirt 40 secured to the bottom 32. The posts 38 are connected to the wall 22 to incorporate the panels 30 into the wall structure. The semicylindrical segments may be fashioned from various materials including standard or safety glass, bulletproof glass, acrylic or solid bars as desired.

The top 42 is typically disposed in or incorporated into the ceiling (not shown) of the facility. The panels 30, top 42, and bottom 32 cooperate to define cylindrical housing 28 having two arcuate portals, an entrance 44 in general access area 26 and an exit 46 in security area 24.

To prevent unauthorized persons from passing from entrance 44 through housing 28 to exit 46, door 20 includes a revolving door member 48 disposed in the housing (see FIG. 2). Revolving door member 48 has a rotatable shaft 50 supported between the top 42 and bottom 32 centered along the axis of revolution of the door. The top 42 has an axial opening (not shown) through which shaft 50 protrudes. Four wings 52 project outwardly from shaft 50 and are of sufficient length to sweep close to semi-cylindrical panels 30. While door 20 preferably has four identical panels or wings 52 spaced roughly 90° from one another, more or fewer panels could be used as desired. The four spaced panels 52 cooperate with housing 28 to define four rotatable pie-slice-shaped compartments. A person desiring to move from one of the areas 24,26 to the other enters a selected compartment and travels therewith between entrance 44 and exit 46.

Door 20 includes a drive system 60 which comprises an electric motor, a motor multiplier and a gear reducer such as described in U.S. Pat. No. 4,627,193, hereby incorporated by reference. Drive system 60 is coupled to revolving door member 48 so that operation of the drive system rotates member 48.

The door wings 52 each include a rectangular frame 70 supporting a pane 72. The frame 70 has a length to project from the shaft 50 to sweep closely to the semicylindrical panels 30 as the member 48 revolves and a height to extend from a location near the bottom 32 to a position near the top 42. Accordingly, the wings 52, in cooperation with the housing 28, define the compartments.

The wings 52 can be formed many different ways. For example, the wings need not be solid panes, but can be formed by bars, grating or the like.

To prevent unauthorized ingress and egress from security area 24, a control system is provided to perform the appropriate regulation. In the disclosed embodiment, the control system according to the invention is located in a box 94 on the top 42 of housing 28. While the following description is (for purposes of explanation) primarily directed toward unauthorized entry into security area 24, the description is equally applicable to the situation wherein unauthorized items including personnel attempt to exit the security area.

As shown in FIG. 3, the control system includes a main processor 194, a controller 294 and supporting peripheral hardware housed within enclosure 94 for controlling the starting, stopping and directional rotation of the motor and shaft which turn the compartments. As a specific example of the preferred embodiment, the main processor is an Intel 8749 or 8751 microprocessor manufactured by Intel Corporation and the controller is a Zilog Z8 microprocessor manufactured by Zilog Corporation. The peripheral hardware includes a memory 394 sufficiently large to perform calculations and control functions which will hereinafter become apparent, for example, a random-access memory (RAM). Suitable types and sizes of memory will be evident to one of ordinary skill and will depend upon the desired speed and accuracy of the detection system and the various memory management techniques adopted.

The main processor 194 includes or is linked to a mechanism which determines door position, e.g. by using a pulse generator as set forth in U.S. Pat. No. 4,627,193. In that patent, door position is tracked by using a cam and a cam follower, which has its motion translated by a proximity sensor into pulses which occur at each predetermined increment of door rotation, e.g., 3°. This mechanism is represented in FIG. 3 herein by position detection system 197. The pulses are recorded by a counter, which is read by the main processor 194. The value on the counter corresponds to a specific amount of door rotation. When the door completes 180° of rotation, i.e. the point in the present embodiment where the entered compartment has moved to the exit compartment, another proximity detector in the position detection system 197 indicates such movement to the main processor 194, and the processor stops-drive system 60 and resets the counter. The control system also includes identification devices 110, 114 such as card readers or other means for identifying an authorized user to initiate the entry sequence and anti-jam features as set forth in that same patent.

In the present invention, to detect people or objects, the door includes an array of sensors 99a–99h, preferably arranged in a circular pattern around the ceiling of the housing as depicted in FIG. 2. It is preferred to mount the sensors on the ceiling rather than the floor where they may be stepped on or subjected to rain, water, snow, dirt or other undesirable environmental conditions. Nevertheless, with appropriate environmental protection, the sensors are also mountable on the floor.

The sensors radiate energy waves, preferably ultrasonic, in a generally conical shape and detect the echoes of the waves reflected from any physical surfaces encountered. Having multiple concentric arrays of the sensors around center post-axis 24 allows greater coverage of the area in the compartment. Preferably, each circle includes at least one sensor for each compartment, each sensor being placed at an angular displacement about the center post-axis identical to that of the angle defined by any two adjacent door panels 52. In the illustrated revolving door, adjacent panels meet at 90° so that the sensors are separated by 90°. Although this geometry is preferred, there are many other configurations and numbers of sensors which will provide suitable coverage of the housing and which fall within the spirit and scope of the invention.

In general, operation takes place as follows: Once an authorized user has been identified by the card reader 110 or 114, the main processor 194 activates the position detection system 197 and also activates drive system 60 to revolve the compartments. At the same time or substantially contemporaneously, the main processor 194 instructs controller 294 to activate sensors 99a–99h to detect non-empty compartment. The sensors emit bursts of ultrasonic waves and detect return echoes from objects including people. FIG. 3 shows controller 294 in association with memory 394 and sensor 99a. Connection with and operation of the other sensors is the same.

In particular, sensor 99a receives at preset time intervals a digital waveform $A_1$ from the controller having a frequency in the ultrasonic range. The sensor has a transmitter 199a, which includes an amplifier for translating the electrical waveform into successive bursts of ultrasonic acoustical waves directed from the sensor head toward the floor of each compartment. Each sensor head also includes a receiver 299a having a sense amplifier for detecting return echoes of the waves. The transmitter and receiver are typically dormant when there is no attempted passage through the revolving door. That is, signal $A_1$ is not being generated or sent.

During attempted passage, the transmitter and receiver are activated by controller 294 which sends signal $A_1$ and also a signal $GC_1$ adjusting the gain of the sense amp to an amount appropriate for receiving the echoes. Preferably, the gain of the sense amp is increased over time by controlling the time period between each clock signal in signal $GC_1$. In other words, the gain clock signal selectively increments the gain of the receiver in digital steps, which may be set and implemented by using an integrated circuit in the sensor head. Each pulse on the gain clock line increments a counter in the sense amp in receiver 299a to select the next highest incremental gain step. The counter is reset to the first, i.e. lowest gain step, by a burst signal. Control of the time spacing between gain clock pulses determines the rate of increase of gain with time following the burst, and eliminates the need for different sensor heads for different environments. A suitable gain clock signal is active low and is approximately 15 microseconds wide.

The amount of increase of gain with respect to time may be selected and set at installation based primarily on the door structure. For example, in a door with highly polished or mirror-like surfaces, a smaller gain with time is appropriate than in a door with a textured rubber floor, and bar-like door wings.

The bursts $A_1$ through $A_8$ are typically relatively short, e.g. 0.5 ms, and drive the ultrasonic transmitter at a frequency on the order of 48 kHz, but this frequency may vary as explained below. Preferably, the bursts are active low.

After each burst, the controller 294 waits a predetermined period of time so that the sense amp in sensor 99a can receive the echoes of any objects the burst encounters. This "echo receive time" is at least as long as the maximum desired distance d set for the sensors to detect objects in the chambers. For example, in a typical door with a floor-to-ceiling distance of 8', d could be set to 7' (12" above the floor). The echo receive time is determined empirically, e.g., when the door is installed, or is calculated based on the speed of the ultrasonic waves. Preferably, the time between bursts is set greater than the echo receive time, so that any reverberations will die out or substantially die out by the next burst. In addition, interference from other chambers will be minimized.

The echoes are received by the sense amps in sensors 99a through 99h in real time, and the gain of the sense amps is controlled over this time to effectively convert the echoes into digital signals $B_1$ through $B_8$. The sense amps simply are "go"/"no go" detectors that pass a single bit digital signal $B_1$ to an input port of the controller 294.

Figure 4A:
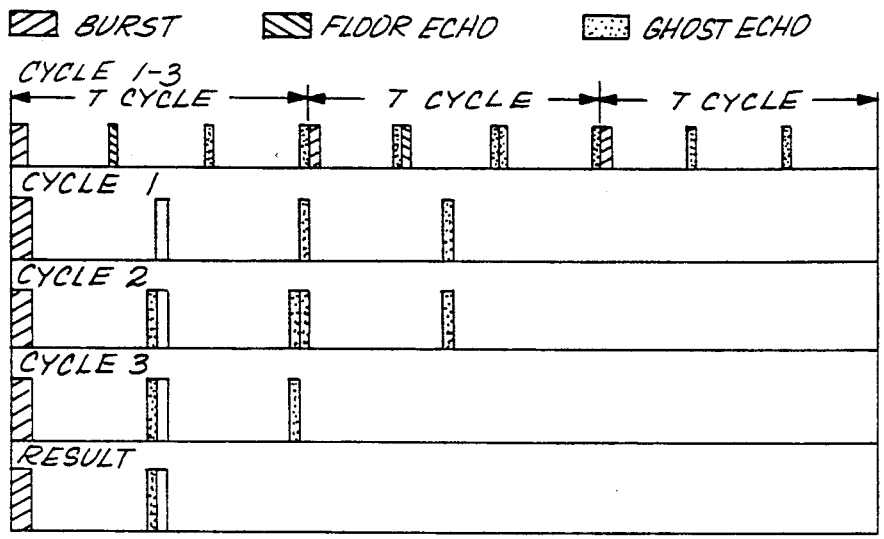
FIGS. 4a and 4b are waveform diagrams of the energy waves emitted by and reflected toward the sensor.
Figure 4B:
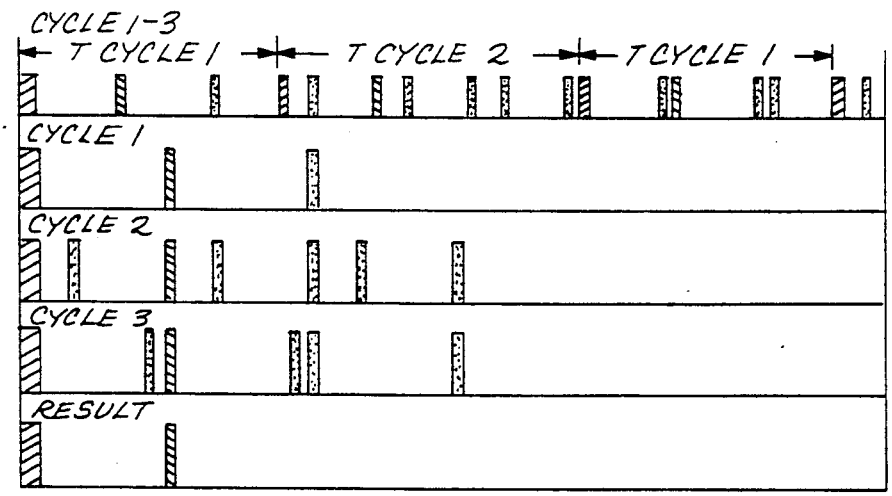

One of the problems with using sensors in a relatively closed structure such as a revolving door is noise from echo reverberation causing false detection of objects. The present invention solves this problem in a novel way. The problem of echo reverberation is shown in FIG. 4A. When the bursts have a constant cycle rate, "ghost" echoes of an initial echo occur due to multiple reflections, especially in a closed chamber and especially where the energy waves are sufficiently powerful to enable detection of small or soft objects. The ghosts will be received at the same elapsed time following each particular burst. To avoid reading these ghosts as true echoes, the system is modified in two ways. First, the burst cycle time is varied, as shown in FIG. 4B. This causes ghosts to be misaligned. Second, the detected echoes following each burst are stored (in memory 394 shown in detail in FIG. 5 as explained below) in relation to the elapsed time from the most recent burst, and the echoes from (at least) the last two bursts are logically ANDed to obtain a results array R. Any echoes that occur at the same time interval after both the last two bursts will result in a "1." Otherwise, the result is "0" for that time interval. As shown in FIG. 4A, where the cycle times do not vary, ghosts will occur in cycles 2 and 3 at the same elapsed time, causing an erroneous detection. However, as shown in FIG. 4B, the ghosts do not occur at the same elapsed time due to the varying burst cycle, so the ghosts are cancelled out by the ANDing process.

Figure 4C:
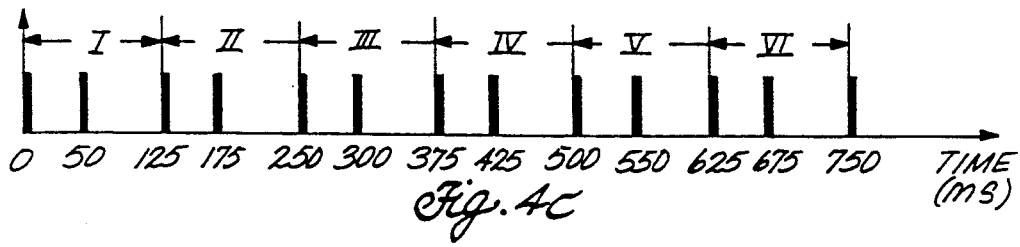
FIG. 4c is a waveform diagram of energy waves emitted by the sensor.

Another problem that can arise by using sensors in a revolving door is interference caused by echoes or reflections from bursts in one chamber reaching sensors in other chambers. Often, the door wings are formed solidly, thus preventing interference. In such a case, burst signals $A_1$ through $A_8$ are sent in any desired fashion, e.g. simultaneously, staggered or sequentially. That is, as shown in FIG. 4C, signals $A_1$ through $A_8$ are each formed by signal portions I, II, etc. However, if the door wings are constructed non-solidly, interference is likely to occur so it is preferable to send sequential or staggered signals $A_1$ through $A_8$. That is, $A_1$ and $A_2$ are sent to sensors 99a, 99b (e.g. in period I), then signals $A_3$ and $A_4$ are sent to sensors 99c and 99d (e.g. in period II), followed by signals $A_5$ and $A_6$ being sent to sensors 99e and 99f (e.g. in period III), then signals $A_7$ and $A_8$ are sent to 99g and 99h (e.g. in period IV). This pattern keeps repeating. Sequential emission avoids detection of echoes due to bursts of sensors in one area by sensors in another area.

Any reasonable staggered or sequential rotation of sensor operation is acceptable. The stagger or sequence time should be set taking into account the gain of the sensor head and the dimensions of the chambers, as the smaller the chambers and the greater the gain, the more multiple reverberations will be likely to interfere with sensors in other chambers. Accordingly, the greater the delay time between the activation of sensors in one chamber and activation of sensors in another chamber, the more the reverberations die out. It should be noted that reduction of the gain too much will jeopardize the ability to detect small or soft objects, including reducing the ability to detect card passback.

With reference to FIG. 5, the storage of echoes and the ANDing process will be explained in more detail. The memory is preferably in the form of multiple storage arrays 101 et seq. Each array has eight columns, each column for storing echoes of a particular sensor. Each bit in each column corresponds to an amount of time it takes, following a burst from that particular sensor, for an echo to return to the sensor. As time corresponds directly to the distance an object is from the sensor, each bit in a column also corresponds to a particular distance of an object from the sensor. In the disclosed embodiment, there are sixty-four bits in each column. If the distance d is 7' (84"), and each bit represents a predetermined incremental distance such as 1.5", fifty-six bits represent 7'. In the preferred embodiment, the sensors are designed to output a binary signal, i.e., either an "echo" or a "no echo" signal. The controller 294 keeps track (e.g. by a timer, counter or other means) of how much time has elapsed since a burst, and places the "echo" or "no echo" signal received from the sensor in the appropriate bit for that amount of time. That is, the controller 294 will take echoes or no echoes and place "1" (echo) or "0" (no echo) in each bit at least up to fifty-six in array 101 for echoes of a first burst, until the fifty-sixth bit is filled. Following a second burst, the controller fills array 102 in the same way. The process continues until array 10n has been filled. Then, the controller fills the results array R by logically ANDing each matching pair of bit and sensor numbers from each array 101 through 10n. For example, the value stored in bit 1 for sensor 1 in array 101 will be ANDed with the values stored for bit 1 for sensor 1 in arrays 102 through 10n, and the result will be stored in bit 1 for sensor 1 in the results array R. If all the first bits are "1", the first bit in the results array will have a "1", otherwise it will have a "0".

This logical ANDing process, together with the varying of the burst repetition rate, (cycle time), removes or at least minimizes the affect of any ghost reflections that get stored in any of the arrays 101 through 10n. For example, if cycle times of the burst signals are constant, the ghost echoes are likely to be stored in coincident bit numbers in each array 101 through 10n, causing a "1" to be incorrectly stored in the results array R. When the cycle times are varied, ghosts are not likely to coincide, so a false "1" stored in a particular bit in one array will be eliminated during logical ANDing by a "0" in the same bit number in another array. Generally, two arrays are sufficient to eliminate ghosts, but if memory space is available, more arrays ensure greater reliability. The filling of the storage arrays 101 through 10n and the results array R are all preferably done in real time, but can be delayed if desired.

Another problem with ultrasonic detectors is that a door panel passing beneath the sensor returns an echo as would an object or a person in the compartment. Accordingly, it is necessary to provide the controller 294 with a mechanism for distinguishing between a door panel echo and an item in the compartment. If an echo is returned from some minimum distance within which the top of the door panel lies, the controller interprets the echo as being from a passing door panel and does not undertake security procedures. In FIG. 5, the minimum distance is represented by bit number "m" in each array and results array R, which is shown as the second bit. (In general, the number will depend on the distance from the sensor to the top of the door panel, and the incremental distance that each bit in an array column represents.) So, when bits 1 and 2 are "0", no door wing is passing by. However, if bit 1 and/or 2 is "1", a door wing is assumed to be passing by.

When a door frame has been detected, the system blanks out all responses, e.g., ignores any further sensor feedback from the sensor(s) for which a door frame has been detected. So, if a "1" is in bit 1 or 2 for sensors 99c and 99d (e.g., sensors 3 and 4 in FIG. 5) in array 101, the controller 294 clears all bits in array 101 for sensors 99c and 99d. The same will be true if the controller detects a "1" in bit 1 or 2 in the next array 102. This clearing process has the effect of creating all "0s" in the results array R for the columns corresponding to the sensors (99c and 99d) where a door frame has been detected, due to the ANDing process. If clearing takes place after ANDing, the results array is either cleared in the corresponding column or ignored for that corresponding column.

The clearing process is important to avoid erroneous detection of an object. When a door frame passes under a sensor, there often are numerous reflections of an ultrasonic burst between the sensor face and the top of the door frame. Such reflections would cause "1s" to be stored in the column corresponding to the sensor for several time periods in the memory array, which might correspond to three or four feet downward into the chamber. Accordingly, it is possible that these or some of these false "1s" will AND with other false "1s" and cause the results array to falsely indicate detection of an object. Although the count in the door position detection system 197 could be used to determine when door frames are passing particular sensors and the results array can be ignored for those sensors, the "1s" recorded in the array 101, 102, . . . , or 10n, might AND with future false "1s" to create a false object detection. Clearing only the column corresponding to the sensor detecting a door frame enables random placement of the sensors. Use of array clearing also eliminates any dependence on tolerances in door position detection. Moreover, as the door frame passes the radially outer sensors in fewer burst cycles (and thus fewer degrees of rotation) than the radially inner sensors, the controller recovers faster from door frame passage at the outer sensors. Thus, sensing ability can be recouped relatively quickly, and without the tolerance problems incurred by relying on door position detection.

Controller 294 evaluates the contents of the results array R, and passes the echo or no echo information to the processor 194 for decision making regarding empty and non-empty compartments. That is, controller 294 preferably sends at least six signals (i.e., six input lines) to processor 194.

The first four signals indicate object detection (other than a door frame) at sensors 99a or 99b, 99c or 99d, 99e or 99f, and 99g or 99h, respectively. Alternatively, a signal could be sent for each sensor. The fifth and sixth signals indicate object detection by trapped man sensors 99i, 99j, respectively. Additional inputs such as a seventh signal to indicate alarm output, tampering with the sensor(s), failed sensor(s), or the like, may be added.

Where the control system is equipped with antipassback (prevention of card passback) features such as disclosed in U.S. Pat. No. 4,627,193, object detection can be used to improve the reliability of the system. If an object has not been detected in the authorized chamber by a predetermined amount of rotation of the door wings, such as 90° from their starting position, the processor could stop and reverse the drive system, until the door wings are returned to their starting position. For example, if the ID device 110 indicates authorized entry at area 26, at least one of sensors 99g, 99h must indicate an object by the time the door wings have moved 90°. This antipassback feature can also require at least one of sensors 99e, 99f to indicate an object at some time between when the door wings have moved 90° to when they have moved 180°. Thus, even though antipassback normally prevents the same ID device from recognizing the same card twice, if the authorized user neglects to enter the door, the ID device where the user inserted the card will still recognize that card.

With reference to FIG. 6 which is a flowchart of the main operations of the processor and controller, an authorized user first inserts a card into one of the key card readers 110, 114 to begin operation of the door. The device 110 or 114 determines whether the user is authorized (step 6-1), and if so, the processor 194 starts the drive system (step 6-2). A variable i is set to 1 (to represent array 101) (step 6-3) and the processor determines whether the user has passed from the entry point to exit point (step 6-4). If so, the drive system is deactivated (step 6-5) by the processor 194 and trapped man sensors 99i and 99j (described below) are activated (step 6-15) by the controller 294. If passage is not complete, the controller sends signals $A_1$ through $A_8$ to sensors 99a-99h and the sensors emit ultrasonic energy waves (step 6-6).

In steps 6-7 and 6-8, the echoes (signals $B_1$ through $B_8$) are received for each sensor, and stored in array "i". The ANDing process also takes place to fill or update the results array (step 6-8), as ANDing is preferably performed in real time. When the results array R is filled/updated, the controller evaluates the results array to find any echoes and their distances (step 6-9). This step may involve performing fail-safe functions as discussed in U.S. Pat. No. 4,682,153 (Boozer, et al.), checking the echoes to determine if the floor echo is present, and the like. Next, the controller 294 determines whether or not a door wing has been detected (by examining the first m bit(s) in each column of array "i") (step 6-10), and if a door wing is detected, the clearing operation is performed (step 6-11). The controller 294 will clear the columns in array "i" which corresponds to any sensors detecting a door wing. If, as shown in FIG. 6, ANDing has already taken place, the controller may also ignore, e.g. inhibit, output for the corresponding columns in the results array. Alternatively, ANDing could be delayed until after the clearing operation.

The controller 294 may also detect sensor failure or blockage (step 6-12), e.g., if a door wing has been detected for a predetermined minimum amount of time or a door rotation amount, and implement security measures in that case (step 6-17). Such security measures may include any or all of the following which are appropriate (as in other situations where security measures are appropriate): stopping further progress of the door, stopping and reversely rotating the door, initiating an alarm, or other appropriate measures. If there is no door wing detected, or after clearing (with no failure detection), the processor 194 examines the inputs (on the first four lines) from the controller 294. Whether or not a chamber is authorized or unauthorized is determined by the processor 194 using outputs from identification device 110 or 114 such as in U.S. Pat. No. 4,627,193, or other suitable means. That is, authorized entry at area 24 will be relayed by the identification device 114 to the processor 194, which will then recognize signals from sensors 99c or 99d (line 2 in FIG. 3), and 99a or 99b (line 1) as authorized, and sensors 99e or 99f (line 3) and 99g or 99h (line 4) as unauthorized. (The opposite is true for authorized entry indicated by device 110.) Accordingly, the processor knows which chambers are authorized and which are unauthorized for use in step 6-13. If there are echoes in unauthorized chambers, security measures are taken.

In the case where object detection is used to supplement an antipassback feature, the processor performs step 6-14. That is, the processor checks for echoes in authorized chambers by using the information on lines 1–4, the inputs of devices 110 and 114, and the input of the position detection system 197 to determine if echoes have been received in the authorized chambers by the predetermined amount of time or amount of door rotation. In this way, the position detection system, which keeps track of the authorized chamber, serves to keep track of the authorized user. If echoes have not been received in authorized chambers, security measures are implemented (step 6-17). If there are no echoes in unauthorized areas, and there are echoes in the authorized areas (or there is no antipassback feature), then the controller 294 next determines which storage array will be updated in response to echoes from the next burst to be generated. This is done by determining whether the storage array "i" that has just been filled is the last one (i=n) (step 6-18). If array "i" is the last one, "i" is set to one (step 6-3) so that the first array 101 has its contents replaced by the echoes in response to the next burst. If the storage array that has just been filled is not the last array 10n, then "i" is incremented by 1 (step 6-19), so that the next array has its contents replaced. Thus, the contents of each array are successively updated, and the contents of the results array are updated each time a storage array has been updated.

Sensor failure or blockage may be detected in several ways. If sensors are all positioned such that all (or some) door wings will align with the sensors at the same time, the processor or controller can simply check the results array at the first and second bits for each sensor (or the ones which will align) to determine if there is a "1" in at least one of the first and second bits for each sensor. If all the sensors do not show a "1" in at least one of the first two bits, tampering, malfunction or other problem could be assumed. Another method is measuring the amount of time that the first two bits contain at least one "1", and assuming there is a sensor malfunction, jammed door or tampering if the predetermined time for the door to pass the sensor has been exceeded. In such a case, an alarm is triggered or building security is notified.

The range "d" to which the echo receive time is set is based on a compromise between optimum coverage and avoiding noise caused by echoes from the floor which can occur due primarily to changes in the velocity of sound with temperature. That is, as temperature increases, the velocity of sound increases causing the floor to appear to move upward. The shift in apparent floor position is about 0.1% per degree Fahrenheit. For a 10' floor-to-ceiling distance, there is a shift of about 1' per 100° F.

In accordance with a further feature of the invention, the range is controllable. As shown in FIG. 3 and step 6-8, five DIP switches 81 through 85 set the range, each switch representing an incremental increase in the range. For example, switch 81 is 48", switch 82 is 24", switch 83 is 12", switch 84 is 6" and switch 85 is 3", so that turning on all the switches results in a 93" range. If the ceiling height is 8' (96"), the recommended maximum range is 7' (84") as discussed above. A reasonable minimum range is two-thirds of the door height (i.e., 64"). These DIP switches are shown connected to the controller 294 but could alternatively be inputted to the processor 194.

In response to the setting on the DIP switches, the controller determines how many bits in each column of the arrays to fill (or to pay attention to). For example, an 84" setting corresponds to 56 bits, and a 72" setting is 48 bits. The optimal maximum distance setting (set by the DIP switches) can be lengthened if real time temperature compensation is used. Such compensation is performed by measuring the floor echo return time (i.e., the apparent distance of the floor) and correcting for any changes from the expected time distance). This processing can be performed in any "dead time," e.g., during the time between bursts, after the last bit in the array has been filled. Other processing, such as running software timers and finding any failed sensors can be performed in the "dead time" too.

As shown in step 6-15, trapped man sensors 99i and 99j operate following and at times other than authorized passage, in case an item or person is trapped in or enters a compartment at other than the entrance or exit. These sensors are the same as the sensors 99a through 99h, and are controlled in the same way as sensors 99a through 99h. A single memory array or multiple memory arrays may be used for these sensors 99i, 99j, and the ANDing process may also be used. When a trapped item or person is detected (step 6-16), security measures (step 6-14) are taken, including any of notifying a guard, triggering an alarm, inhibiting door movement, reversing the door or other appropriate measures.

The disclosed embodiment is only an illustration of the invention, and is not intended to limit the scope of the invention as defined in the appended claims. For example, instead of a separate processor and controller, the control system can include just one microprocessor/controller to perform all of these functions, such as represented by the dashed line box 494 in FIG. 3.

What is claimed is:

1. A control system for a security door of the type having a housing with a first portal, a second portal, and movable door means for normally blocking passage through the second portal, the control system comprising:

means for identifying an authorized user;

means for moving the door means to allow passage through the second portal;

sensing means disposed in the housing for emitting energy waves into the housing between the first and second portals, and for detecting echoes of the energy waves due to any objects or persons in the housing and outputting a signal indicative of an echo or no echo;

detection means for determining the position of the authorized user; and controller means, connected to the sensing means, the means for identifying, and the detection means, for driving the means for moving in response to identification of an authorized user, and for detecting passage of any objects or persons other than the authorized user based on the position of the authorized user and the detection of any echoes by the sensing means, wherein the controller means has a memory associated therewith for digitally storing an indication of one of a detected echo and no detected echo for each of a selected number of bits in the memory, each bit corresponding to a predetermined distance from the sensing means, so that the selected number of bits corresponds to a predetermined range from the sensing means.

2. A control system for a security door of the type having a housing with a first portal, a second portal, and a movable door means for normally blocking passage through the second portal, the control system comprising:

means for identifying an authorized user;
means for moving the movable door means to allow passage through the second portal;
sensing means disposed in the housing for emitting bursts of energy waves into the housing between the first and second portals, and for detecting echoes of the energy waves due to any objects or persons in the housing and outputting a signal indicative of an echo or no echo;
detection means for determining the position of the authorized user; and
controller means, connected to the sensing means, the means for identifying, and the detection means, for driving the means for moving in response to identification of an authorized user, and for detecting passage of any objects or persons between the first and second portals based on the position of the authorized user and the detection of any echoes by the sensing means.
wherein the controller means generates a gain clock signal, and the sensing means includes means for incrementally increasing a gain of the sensing means, the gain of the sensing means being reset by each burst.

3. A method for controlling a security door of the type having a housing with a first portal, a second portal, and movable door means for normally blocking passage through the second portal, the method comprising the steps of:

identifying an authorized user;
moving the movable door means to allow passage through the second portal in response to identification of an authorized user;
emitting bursts of energy waves from a sensor into the housing between the first and second portals, and detecting echoes of the energy waves with the sensor due to any objects or persons in the housing; and
determining the position of the authorized user, and preventing passage of any objects or persons detected other than the authorized user as determined by the position of the authorized user and detection of any echoes,
wherein an indication of one of a detected echo and no detected echo is stored in a memory for each bit of a selected number of bits in the memory, each bit corresponding to a predetermined range from the sensor.

4. A method for controlling a security door of a type having a housing with a first portal, a second portal, and a movable door means normally blocking passage through the second portal, the method comprising the steps of:

identifying an authorized user;
moving the movable door means to allow passage through the second portal in response to identification of an authorized user;
emitting bursts of energy waves from a sensor into the housing between the first and second portals, and detecting echoes of the energy waves with the sensor due to any objects or persons in the housing; and
determining a position of the authorized user, and preventing passage of any objects or persons detected other than the authorized user as determined by the position of the authorized user and detection of any echoes,
wherein a gain of the sensor is increased incrementally after each burst, and reset by a subsequent burst.

5. A control system for a security door of the type having a housing with a first portal and a second portal, a door member rotatably disposed in the housing, and having a plurality of wings which, in cooperation with the housing, define a plurality of compartments movable between the first and second portals in response to rotation of the door member, the control system comprising:

means for identifying an authorized user;
means for rotating the door member;
sensing means disposed in the housing for emitting bursts of energy waves into the housing between the first and second portals, for detecting echoes of the energy waves due to any objects or persons in the housing and outputting a signal indicative of an echo or no echo; and
controller means, connected to the sensing means, the means for rotating, and the means for identifying, for driving the sensing means and the means for rotating in response to identification of an authorized user, and for detecting passage of any objects or persons in any of the compartments based on the detection of any echoes by the sensing means.
wherein the controller means further comprises means for ignoring any echoes detected from the door member wings as the door member wings pass by the sensing means, the means for ignoring comprising means for determining that a door member wing is passing by on the basis of receiving an echo within a predetermined elapsed time of emission of a burst of energy waves by the sensing means.

6. The control system of claim 5, further comprising means for tracking the position of the authorized user by tracking the compartment entered by the authorized user, and wherein the controller means further comprises means for stopping rotation of the door member in response to detection of passage of objects or persons in any compartment other than the entered compartment.

7. The control system of claim 5, wherein the controller means has a memory associated therewith for digitally storing an indication of one of a detected echo and no detected echo for each of a selected number of successive bits in the memory, each successive bit corresponding to a predetermined echo return time to the sensing means, so that the selected number of bits corresponds to a maximum return time to the sensing means, and the predetermined elapsed time corresponds to a first number of the successive bits.

8. The control system of claim 7, wherein the sensing means comprises multiple ultrasonic sensors, and the memory comprises an array having the selected number of bits for each sensor.

9. The control system of claim 8, wherein the memory comprises multiple arrays, and the controller means further comprises means for logically ANDing corresponding bits in each array for each sensor, and storing the results in an additional array in the memory.

10. The control system of claim 9, wherein the multiple arrays are arranged such that values stored in a successive one of the arrays in the memory are updated for each successive burst, and values stored in the additional array are updated after each burst.

11. The control system of claim 9, wherein the bursts occur at varying cycle times.

12. The control system of claim 9, wherein the controller means further comprises means for, prior to ANDing, clearing any echoes from all of the bits from each array associated with a sensor for which the means for determining has determined that a door member wing is passing by.

13. The control system of claim 5, wherein the sensing means comprises multiple ultrasonic sensors driven sequentially.

14. A method for controlling a security door of a type having a housing with a first portal and a second portal, a door member rotatably disposed in the housing and having a plurality of wings which, in cooperation with the housing, define a plurality of compartments movable between the first and second portals in response to rotation of the door member, the method comprising the steps of:

identifying an authorized user;

rotating the door member in response to identification of an authorized user;

emitting bursts of energy waves from sensors into the housing between the first and second portals, and detecting echoes of the energy waves due to any objects or persons in the housing;

determining whether any echoes are detected from a door member wing passing by a sensor based on whether any echoes are received within a predetermined elapsed time following emission of a burst of energy waves from that sensor; and determining the position of the authorized user, and preventing passage of any objects or persons detected in compartments other than the compartment containing the authorized user, except that echoes detected from a passing door member wing are ignored.

15. The method as recited in claim 14, wherein the position of the authorized user is determined by determining which compartment the authorized user has entered.

16. The method as recited in claim 15, wherein an indication of one of a detected echo and no detected echo is stored in a memory for each bit of a selected number of successive bits in the memory, each successive bit corresponding to a respective predetermined echo return time to the sensors, so that the selected number of bits corresponds to a maximum echo return time to the sensors.

17. The method as recited in claim 16, wherein multiple ultrasonic sensors are used, and the energy waves are ultrasonic waves.

18. The method as recited in claim 17, wherein the echoes or no echoes detected are stored in the memory separately for each sensor, the memory having at least two successive arrays, and each successive array is filled in response to the echoes or no echoes detected following each successive burst, wherein corresponding bits in each successive array for each sensor are logically ANDed and stored in an additional array updated after each successive burst, and a person or object is detected only if a bit in the additional array contains an indication of an echo.

19. The method as recited in claim 18, further comprising the step of clearing all bits associated with each successive array prior to ANDing, for any sensor that has detected an echo within the predetermined elapsed time.

20. The method as recited in claim 14, wherein the energy waves are emitted from ultrasonic sensors.

* * * * *

UNITED STATES PATENT AND TRADEMARK OFFICE
CERTIFICATE OF CORRECTION

PATENT NO. : 5,097,454
DATED : March 17, 1992
INVENTOR(S) : Milan Schwarz; Robert Mayer It is certified that error appears in the above-identified patent and that said Letters Patent is hereby corrected as shown below:

Column 1, line 16, before "passenger" insert -- security door is a revolving door with a plurality of --.
Column 2, line 35, change "generates" to -- that generate --.
Column 6, line 6, change "compartment" to -- compartments --.
Column 8, line 41, change "affect" to -- effect --.
Column 11, line 48, change "problem" to -- problems --.
Column 11, line 62, before "apparent" insert -- the --.
Column 12, line 20, after "distance" delete the closing parentheses.

In the Claims

Column 14, line 41, after "means" change the period to a comma.

Signed and Sealed this

Fifth Day of October, 1993

Attest:

BRUCE LEHMAN

Attesting Officer

Commissioner of Patents and Trademarks